May 6, 1958     F. H. SHEPARD, JR     2,833,987

BALANCEABLE SATURABLE REACTOR

Filed April 12, 1954     2 Sheets-Sheet 1

INVENTOR.
FRANCIS H. SHEPARD JR.
BY
ATTORNEY

May 6, 1958 F. H. SHEPARD, JR 2,833,987
BALANCEABLE SATURABLE REACTOR
Filed April 12, 1954 2 Sheets-Sheet 2
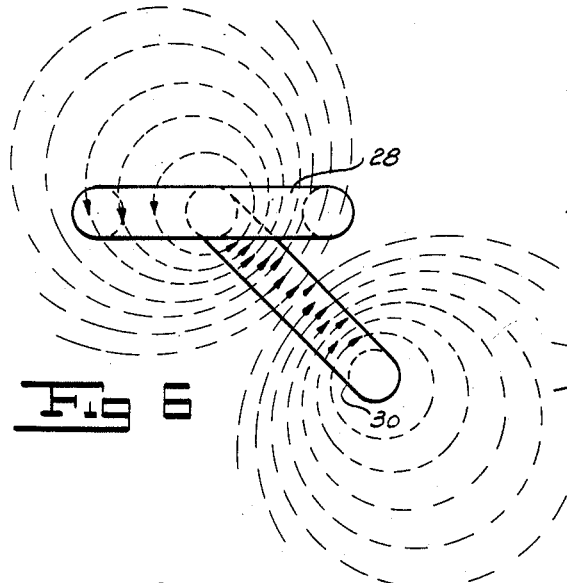
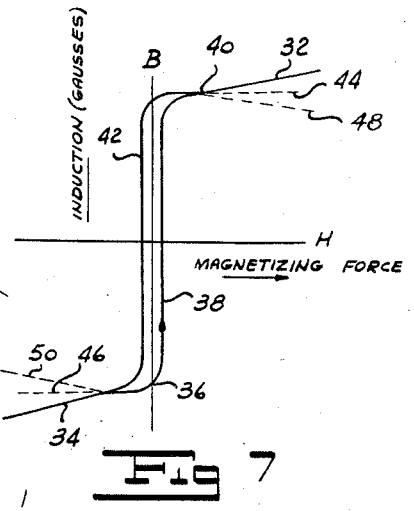
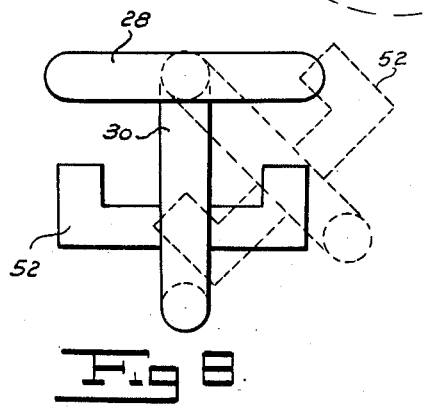
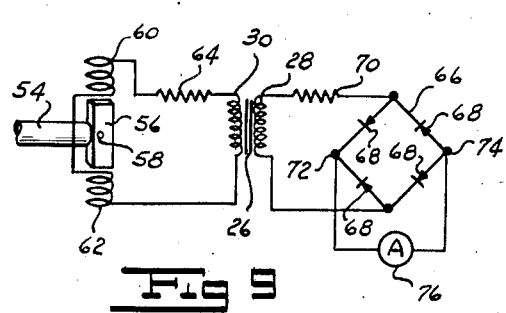
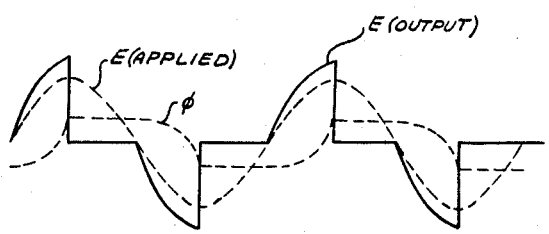
INVENTOR.
FRANCIS H. SHEPARD JR.
BY
ATTORNEY

United States Patent Office 2,833,987
Patented May 6, 1958

2,833,987

BALANCEABLE SATURABLE REACTOR

Francis H. Shepard, Jr., Summit, N. J.

Application April 12, 1954, Serial No. 422,549

6 Claims. (Cl. 324—70)

My invention relates to a balanceable saturable reactor and more particularly to a saturable reactor in which I provide means to compensate for the effect owing to leakage flux after saturation.

This application is an improvement over my copending application, Serial No. 294,513, filed June 19, 1952, for a Frequency Meter.

Saturable core reactors can be operated so that a sinusoidal input voltage will produce an output which is a series of voltage pulses. In saturable core reactors of the prior art so operated, the area under the curve outlining a pulse in the output is not constant but is a function of the strength of the input signal after the core has become saturated. This "air core effect" is most undesirable in many applications. For example, when a saturable core reactor is employed to obtain the measure of the frequency of the input signal in a manner such as is disclosed in my copending application, Serial No. 294,513, the air core effect will cause the readings obtained to vary, depending upon the strength of the input signal if not corrected as shown therein. I have invented a saturable core reactor in which the leakage flux through the secondary coil after the core is saturated is balanced in an improved and simple manner by disposing the secondary coil so that it is threaded by equal and opposite fluxes from the primary coil to compensate for the air core effect so that the area under a voltage pulse in the output after saturation is independent of the strength of the current flowing through the primary coil and is a function only of the saturation point of the core.

One object of my invention is to provide for a saturable core reactor which is balanceable so that the effects owing to leakage flux are overcome.

Another object of my invention is to provide a balanceable saturable core reactor which may be employed to obtain accurate frequency measurements.

Still another object of my invention is to provide a balanceable saturable core reactor which may be employed as a tachometer.

A further object of my invention is to provide a saturable core reactor in which the air core effect is automatically compensated for.

Other and further objects of my invention will appear from the following description.

In general, my invention contemplates the provision of a saturable core reactor including a relatively high permeability, completely saturable core, a secondary winding fixedly mounted with respect to the core and a primary winding pivotally mounted with respect to the core and the secondary winding so that the primary winding may be pivoted toward either end of the secondary winding to balance out secondary leakage flux after the core has become saturated. In addition, I provide means whereby my balanceable saturable reactor may be employed as a frequency meter or as a tachometer to obtain accurate measurements of frequency or speed.

In the accompanying drawings which form part of the instant specification and which are to be read in conjunction therewith and in which like reference numerals are used to indicate like parts in the various views:

Figure 6 is a view similar to Figure 5 wherein the primary coil is rotated toward the opposite side of the secondary coil from that shown in Figure 5.

Figure 7 is a diagram showing the hysteresis loop in the high permeability core as employed in my balanceable saturable reactor.

Figure 8 is a side view of a modified form of my balanceable saturable reactor.

Figure 9 is a schematic view showing my balanceable saturable reactor in use as a tachometer.

Figure 10 is a family of curves showing the phase relationships between the applied voltage, the flux in the core and the output voltage of my balanceable saturable reactor.

Figure 1:
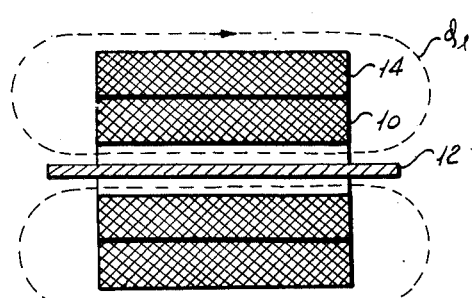
Figure 1 is a sectional view of a saturable core reactor in which the primary and secondary windings are coaxial and surround the core.

More particularly referring now to the drawings, Figure 1 shows a saturable core reactor having a primary winding 10 disposed about a saturable core 12 and a secondary winding 14 superimposed upon and concentric with the primary winding 10. In this reactor, once the core 12 has become saturated, lines of leakage flux will exist in the air gap between the core 12 and the interior surface of primary winding 10 as indicated in broken lines in Figure 1. This leakage flux represents the flux causing the "air core effect." As a result of the air core effect, the area under a voltage pulse in the output from secondary winding 14 will be a function of the strength of the input signal to primary winding 10 after the saturation point of core 12 has been reached.

Figure 2:
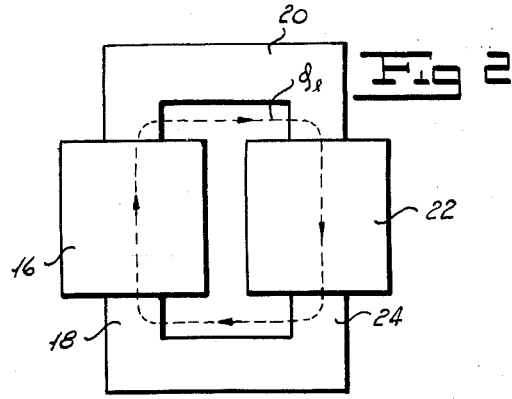
Figure 2 is a plan view of a saturable core reactor in which the primary and secondary windings are wound on opposite legs of a rectangular core.

Figure 2 shows a saturable core reactor having a primary winding about one of the legs 18 of a high permeability core 20 and a secondary winding 22 on the leg 24 of core 20 opposite leg 18. When core 20 has become saturated, leakage flux will travel between the legs 18 and 24 of core 20 across the air gap enclosed by the core as indicated by the broken line in Figure 2. This leakage flux will have an effect on the output voltage of winding 22 similar to the effect of the leakage flux in the reactor of Figure 1.

Figure 3:
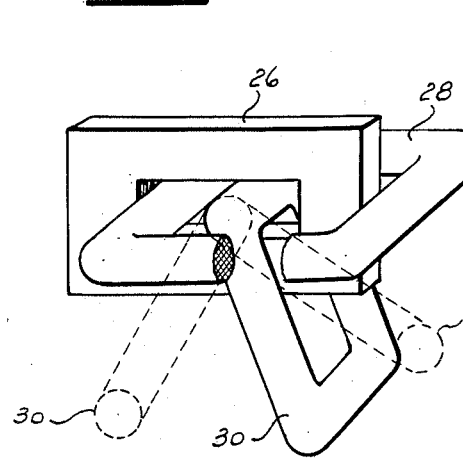
Figure 3 is a perspective view of my balanceable saturable reactor with a part broken away.

My balanceable saturable reactor, as can be seen in Figure 3, includes a high permeability core 26, a secondary winding 28, which is fixed with respect to core 26 by any suitable means and a primary winding 30 pivotally mounted with respect to the core 26 and winding 30 by appropriate means. Referring now to Figure 7, there is shown a hysteresis loop of my high permeability core 26. As is well known in the art, the ordinates of this hysteresis loop or curve are measures of the degree of magnetization of the core and the abscissas indicate the magnetizing force necessary to produce a corresponding degree of magnetization in the core. That is, the ordinates are in units of flux density and the abscissas in terms of current times a constant. Portions 32 and 34 of the curve of Figure 7 represent the relation between flux and current at points beyond the saturation points of the core in a positive or in a negative direction, respectively. They can therefore be said to represent the air core effect. Assuming that the core 26 is initially beyond saturation in a negative direction so that we are on the portion 34 of the curve, as we decrease the magnetizing force toward zero, the flux will gradually decrease until point 36 has been reached. At this point while the magnetizing force is zero, the core retains its residual magnetism in a negative direction. As the magnetizing force is increased in a positive direction, the flux will decrease along the portion of the curve 38 very rapidly and increase in a positive direction after passing through zero. It is to be noted that there is a lag between the time the magnetizing force passes through zero and the time the flux becomes zero. This results from the hysteresis phenomenon, as is well known in the art.

As the magnetizing force is increased still further, the point 40 will be reached at which the core is saturated in a positive direction, and any further increase in magnetizing force will result in a traverse of the straight line portion 32 of the curve which represents the air core effect in the positive direction. If the magnetizing force is decreased from positive saturation back toward negative saturation, the portion 42 of the hysteresis loop will be traversed in a manner similar to the manner in which portion 38 was traversed.

If we could divert the portions 32 and 34 to positions indicated by the lines 44 and 46 in Figure 7, the flux would remain constant no matter how much the magnetizing force was increased after the respective saturation points had been reached, and in a saturable core reactor employing a core whose hysteresis loop was represented by the curve of Figure 7, the area under the voltage pulses of the secondary voltage would then be a function only of the saturation points of the core and would be independent of the strength of the input signal.

The relation between applied voltage, output voltage and flux in a saturable core reactor in which the air core effect has been compensated for are illustrated in Figure 10. It will be apparent from the foregoing that as the applied voltage increases, the flux will increase until the core becomes saturated. I have assumed that the core is initially saturated in a negative direction and shown the flux as decreasing from the negative maximum toward zero and then increasing to saturation in a positive driection as the applied voltage increases. As long as the flux in the core is changing, there will be an output voltage in the secondary, the polarity of which is a function of the direction of change. When saturation has been reached, there will no longer be a change in flux in the core and no resultant voltage in the secondary. Therefore, the secondary voltage can be represented as a series of pulses alternately in a positive and negative direction, depending upon whether the applied voltage is on a positive or negative half-cycle. The flat portions of the flux curve represent the time during which the core is saturated in either a positive or a negative direction.

Figure 4:
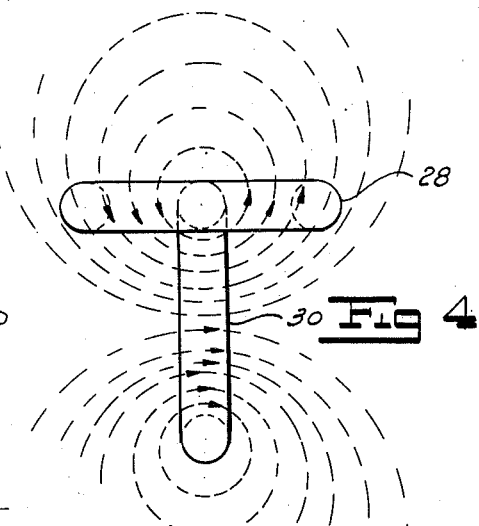
Figure 4 is a side view of my balanceable saturable reactor with the core removed showing the primary coil in its neutral position with respect to the secondary coil and showing the path of some of the magnetic lines of force.
Figure 5:
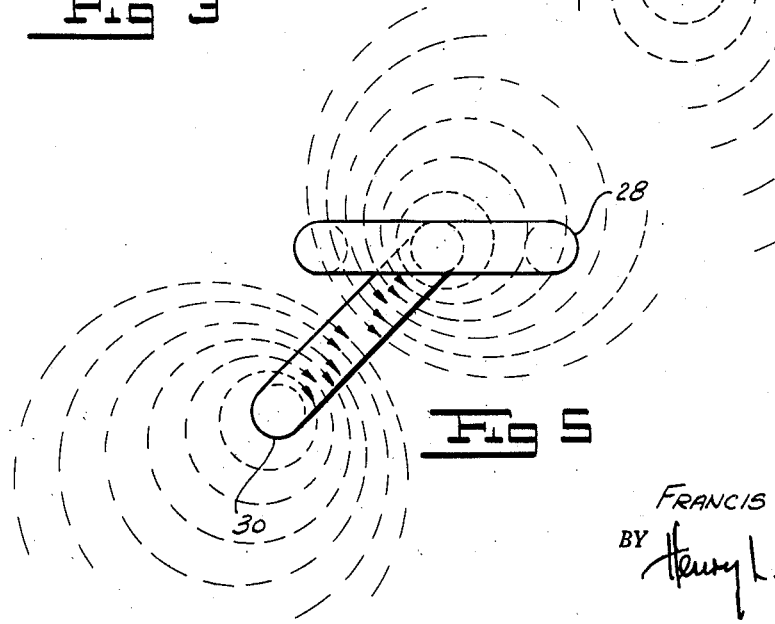
Figure 5 is a side view of my balanceable saturable reactor similar to Figure 4 with the primary coil rotated toward one end of the secondary coil.

In Figure 4 I have shown the primary winding of my balanceable saturable reactor in its neutral position with respect to the secondary winding. It will be appreciated that once saturation has been reached in one direction or the other the core effect may be neglected, since we are off the normal hysteresis loop and a straight line relationship exists between the magnetizing force and the resultant magnetization. For this reason, I have not shown the core in Figure 4. The stray or leakage flux threading the primary winding is indicated in Figure 4 by broken lines. The lines of stray or leakage flux threading both the primary and secondary windings tend to induce an E. M. F. in the secondary winding as the primary current varies. If the number of these lines of stray mutual flux threading the secondary winding in one direction equals the number of lines of stray mutual flux threading the secondary winding in the other direction, the induced E. M. F. in the secondary resulting from this stray mutual flux is zero. When the primary winding carries a current which is greater than that corresponding to the core saturation point, a leakage flux will exist so that the lines of force passing through the center of the secondary winding all flow in one direction. It will be clear from an examination of Figures 4 to 6 that if I relatively rotate the primary coil toward one end or the other of the secondary, there will be more leakage flux from the primary flowing through the secondary winding in one direction than in the other direction. Therefore, if I know the direction of flow of current and thus primary leakage flux through the secondary winding, I can rotate my primary winding so that I thread equal and opposite amounts of primary leakage flux through the secondary coil. This will balance out the voltages induced in the secondary coil by leakage flux to compensate for the air core effect and result in moving the portions 32 and 34 of the curve of Figure 7 to the positions indicated by lines 44 and 46. If this is done, it will be apparent from an examination of Figure 7 that no matter how much the magnetizing force is increased beyond saturation, there will be no effective change in flux through the secondary of the reactor, since lines 44 and 46 are parallel to the abscissa axis. Since there is no change in flux through the secondary beyond saturation, there will be no voltage induced in the secondary beyond the saturation points. Thereby I am enabled to make the area under the voltage pulses in the secondary output of my saturable core reactor depend only on the saturation points of the core so that the area is independent of the magnetizing force after saturation. As a matter of fact, I may rotate the primary winding in a direction such that the primary leakage flux through the secondary coil flows in a direction opposite to that in the unsaturated coil and my reactor is overcompensated. This condition is represented by the broken lines 48 and 50 in Figure 7. It will be appreciated that Figure 5 shows compensation in one direction and Figure 6 shows compensation in the opposite direction.

The modified form of my invention illustrated in Figure 8 provides a greater degree of compensation. In this form I have fixed a number of laminations 52 within the primary winding to concentrate the lines of primary leakage flux so that a greater number of lines can be threaded through the secondary to balance the leakage flux threading the secondary winding. The core 26 of the reactor has not been shown in this view.

Figure 9 shows my balanceable saturable reactor in use as a tachometer. The shaft whose speed it is desired to measure is indicated by the reference numeral 54 and has a two-pole permanent magnet 56 fixed on its end by any suitable means such as a screw 58. A pair of opposite stator windings 60 and 62 are disposed adjacent the magnet 56 so that the unit made up of magnet 56 and windings 60 and 62 can be considered a small synchronous alternator. The frequency of a synchronous alternator can be represented by the expression $$f = \frac{pn}{2(60)}$$

where $f$ is the frequency in cycles per second, $p$ is the number of poles, and $n$ is the speed in revolutions per minute. Since I have a two-pole alternator, it will be clear that the frequency of the output voltage from windings 60 and 62 will be a direct measure of the speed of shaft 54. This alternator output is fed to the primary winding 30 of my saturable core reactor through a current limiting resistor 64 connected in series with winding 30. The output of the secondary winding 28 of my saturable core reactor will be a number of voltage pulses, the area under which is a function only of the saturation point of core 26. If I provide a measure of these areas per unit time, I will have a measure of the frequency of the input to winding 30 and, therefore, of the speed of shaft 54. I feed the secondary output through a second current limiting resistor 70 to a bridge rectifier, indicated by the reference character 66, which is made up of a number of suitable rectifying devices 68 such as selenium-oxide rectifiers.

The bridge rectifier 66 and resistor 70 cause the voltage pulses to provide a direct current output, the aggregate of the area of which is a measure of the number of pulses per unit time. Across the output terminals 72 and 74 of the bridge rectifier 66 I connect an ammeter 76 to integrate and to measure this current. It is obvious that I may calibrate the ammeter 76 in units of frequency or in revolutions per minute, depending upon whether it is desired to measure frequency or speed in revolutions per minute.

In use as a frequency meter, the primary winding 30 of my balanceable saturable reactor is connected to the source, the frequency of which is to be measured. The output voltage from the secondary winding 28 will be a series of alternating positive and negative voltage pulses. Since I have compensated for the air core effect, the area under each of the pulses will be a function only of the saturation point of the core 26 and the total area under the pulses per unit time will be an accurate measure of the frequency of the source. A convenient means to measure the area under the pulses per unit time is the bridge rectifier 66 and meter 76 which integrate the pulses to produce a current reading which is a measure of the number of pulses per unit time.

The ammeter can be calibrated in frequency units from a source of known frequency, the strength of which can be varied sufficiently to drive the core beyond saturation. If this signal is varied within limits above the saturation point and the ammeter reading is not constant, I know that the air core effect is not properly compensated for. If such is the case, the primary winding 30 may be rotated toward one end or the other of the secondary 28 until the ammeter reading remains the same no matter how much the input signal strength is varied. It will be appreciated that, as explained above, my reactor may be calibrated to operate as a tachometer.

It will be seen that I have accomplished the objects of my invention. I have provide a balanceable saturable core reactor in which the primary leakage flux threading the secondary is balanced to compensate for the air core effect and provide an output made up of a number of voltage pulses, the area under each of which pulses is a function only of the saturation point of the core. In addition, I have provided a system wherein my balanceable saturable core reactor may be employed to measure frequency or as a tachometer to measure speed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. In a transformer circuit of the character described, a transformer having a saturable magnetic core, a primary and a secondary winding disposed upon said core and positioned relative to each other so that the changing flux linking said primary and secondary windings through said core after it has been saturated is substantially equal and opposite to the changing flux linking said windings through the region outside of said core, means calibrated in terms of frequency to measure the average voltage output from said secondary winding, and means to apply a current to said primary winding of magnitude at least sufficient to saturate said core whereby the average voltage from said secondary winding is substantially independent of the current to said primary winding above saturation.

2. The method of obtaining a constant output voltage from a saturable transformer regardless of the current input to the transformer above the saturation level, said method comprising the steps of taking a saturable core, disposing thereupon a primary and a secondary winding which are movable relative to each other, measuring the average voltage output from said secondary winding while applying a varying current to said primary winding which is sufficient to saturate the core, and then moving said windings relative to each other to that position in which the secondary voltage remains approximately constant even while the primary current varies.

3. In a saturable transformer of the character described a closed ring-shaped magnetic core of saturable material and having a central opening through it, a secondary ring-shaped winding positioned on said core and engaged through said opening in a plane generally perpendicular to said core, a primary winding positioned on said core and engaged through said central opening and being movably positioned relative to said secondary winding in a plane lying approximately at a right angle relative to the plane of said secondary core, said primary winding being angularly positioned relative to said secondary winding so that the changing fluxes which link said primary winding and said secondary winding through said core after saturation and through the air space surrounding said core are substantially equal and opposite.

4. The combination of elements as in claim 3 in further combination with an arm of magnetic material which is encircled by said primary winding but is not encircled by said secondary winding, and is movable along with said primary winding.

5. A saturable core transformer wherein above a certain level the average voltage obtained from the secondary winding of the transformer is substantially independent of the current applied to the primary winding, said transformer comprising a core of saturable magnetic material, a secondary winding disposed upon said core, and a primary winding disposed upon said core to generate lines of flux linking said secondary winding through said core and at the same time saturating said core and also to generate a substantial number of leakage lines of flux linking said secondary winding through the region outside of said core, said primary winding and said secondary winding being physically positioned relative to each other so that after said core is saturated by said core flux, any increase in said core flux linking said secondary winding is substantially cancelled by a corresponding equal and opposite increase in said linkage flux linking said secondary winding.

6. The combination of elements as in claim 5 wherein at least one of said windings is loosely wound on said core whereby through adjusting the angular orientation between said primary and secondary windings the changing flux linking said primary and secondary windings through said core after saturation can be made exactly equal and opposite to the changing flux linking said primary and secondary windings in the region outside said core.

References Cited in the file of this patent

UNITED STATES PATENTS

| | | |
|---|---|---|
| 671,730 | Mershon | Apr. 9, 1901 |
| 1,929,259 | Rich | Oct. 3, 1933 |
| 2,175,039 | Soulary | Oct. 3, 1939 |
| 2,218,642 | Hathaway | Oct. 22, 1940 |
| 2,477,057 | Grady | July 26, 1949 |
| 2,511,233 | Anderson | June 13, 1950 |
| 2,554,575 | Kurtz et al. | May 29, 1951 |